(No Model.)

E. R. WARE.
JOURNAL BEARING.

No. 287,203. Patented Oct. 23, 1883.

WITNESSES:
H. N. Low
L. H. Marshall

INVENTOR
Edmund R Ware
By Doubleday & Bliss
ATTORNEY

UNITED STATES PATENT OFFICE.

EDMUND R. WARE, OF WORCESTER, MASSACHUSETTS.

JOURNAL-BEARING.

SPECIFICATION forming part of Letters Patent No. 287,203, dated October 23, 1883.

Application filed March 21, 1883. (No model.)

*To all whom it may concern:*

Be it known that I, EDMUND R. WARE, a citizen of the United States, residing at Worcester, in the county of Worcester and State of Massachusetts, have invented certain new and useful Improvements in Journal-Bearings, of which the following is a specification, reference being had therein to the accompanying drawings.

Figure 1:
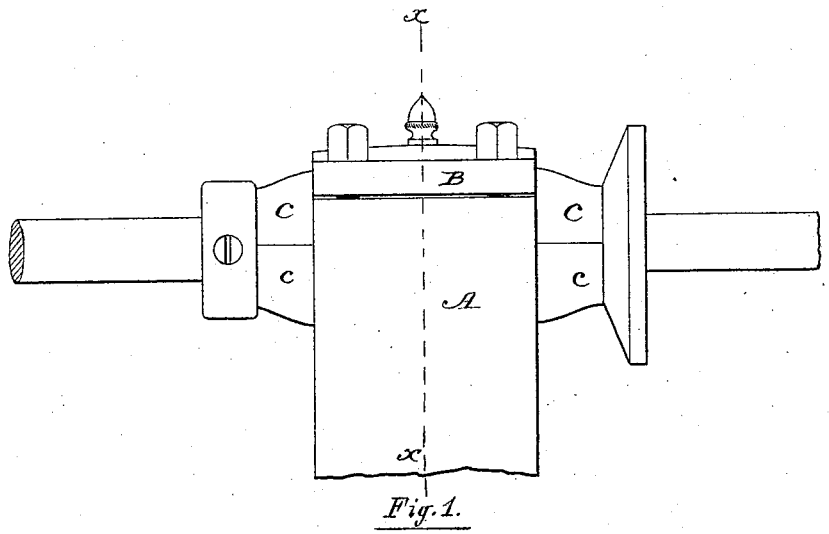
Figures 2, 3:
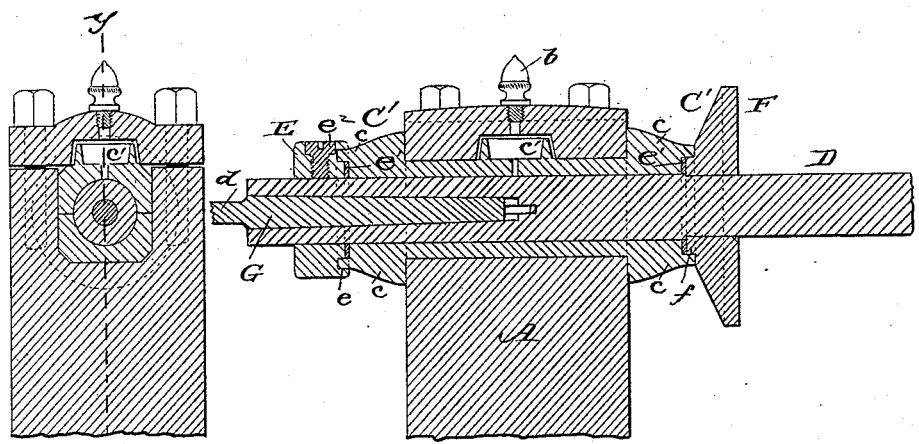

Figure 1 is a side elevation of my invention. Fig. 2 is a vertical longitudinal elevation on line $x\,y$, Fig. 3. Fig. 3 is a transverse vertical section on line $x\,y$, Fig. 1.

In the drawings, A represents a pillow-block or bearing-block, and B the cap thereof, secured by bolts or set-screws, and provided with an oil-hole and stopper, $b$.

C C $c\,c$ are the upper and lower members of a boxing, the central portion of which is substantially right angles in cross-section, as shown in Fig. 3, its ends $c\,c$ being round in cross-section and preferably tapering, their larger diameters being of so much greater size than the central squared portion as to form overlapping flanges or shoulders, which take hold of and fit closely the opposite sides of the pillow-block or bearing A, to prevent lateral movement. At each end these boxings are countersunk or recessed, as at C' C'. The upper half of the boxing is constructed with a central upwardly-projecting flange, whereby is formed an oil cup or receptacle, $c'$, as is customary in such cases.

D is a shaft or journal fitting closely and rotating within the boxing, and provided at one end with a drill-socket, $d$, which is slightly tapering.

E is a collar provided upon its inner face with a groove, $e$, which fits accurately one of the flanged ends of the boxing.

$e'$ is a packing-washer, of rawhide or other suitable material, seated in the recess or chamber at that end of the boxing, and filling closely the space between the bottom of the said recess and adjacent opposing portion of the collar E.

$e^2$ is a set-screw, by means of which the collar is in held position on the journal D.

F is a flange mounted on the journal D at the opposite end of the boxing, and provided with a projecting annular flange or shoulder, $f$, which enters and fits closely the recess in that end of the boxing, where it presses another washer against the adjacent portion of the boxing.

G is the shank of a drill or similar tool, seated in the socket $d$.

By an examination of the drawings it will be readily understood that this bearing is practically dust-proof by reason of the overlapping flanged ends of the boxing and the interposed washers $e'\,f$.

The flanges at the ends of the boxings and the adjacent portions of the flange or disk F and collar E by preference are made tapering, whereby these parts may be adjusted to compensate for wear and maintain closely-fitting joints, whereby dust may be almost absolutely excluded. Thus this bearing is especially adapted for use in grinding and polishing machines, and others in which bearings of the ordinary construction would be subject to the admission of dust and consequent undue wear.

Although in practice I prefer to divide the boxing longitudinally, as indicated in the drawings, yet I do not wish to be limited thereby, as some of the advantages of my construction may be derived by the use of a boxing which is made in one piece.

What I claim is—

1. The combination, with the boxing C C $c\,c$, provided with recesses in its ends, of the collar E and flange or disk F, constructed to enter the recesses, and the washers $e'\,f$, substantially as set forth.

2. The combination of the boxing C C $c\,c$, the disk F, the collar E, and the journal D, provided with the drill-socket $d$, substantially as set forth.

In testimony whereof I affix my signature in presence of two witnesses.

EDMUND R. WARE.

Witnesses:
H. H. DOUBLEDAY,
J. S. BARKER.